Oct. 29, 1940.  R. W. DE LANCEY  2,219,473
FUEL FEED CONTROL
Original Filed March 11, 1935  2 Sheets-Sheet 1
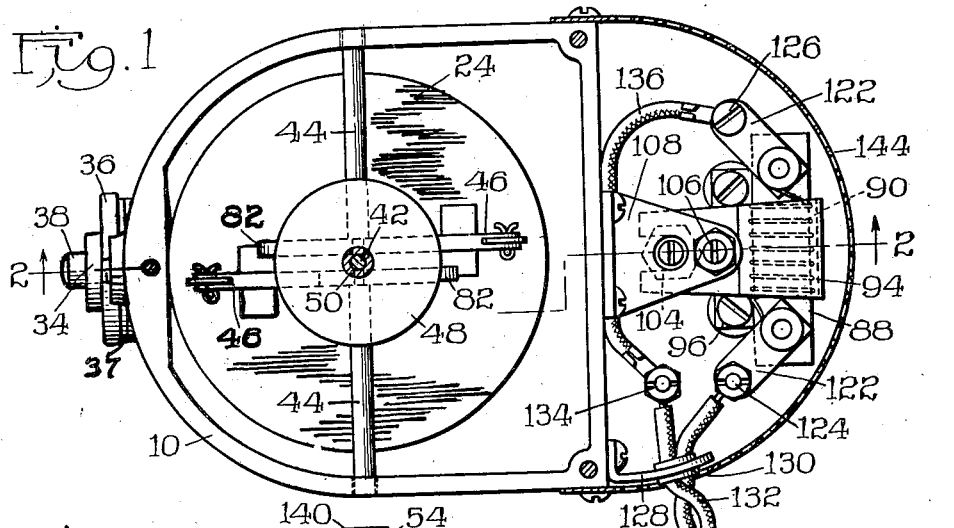
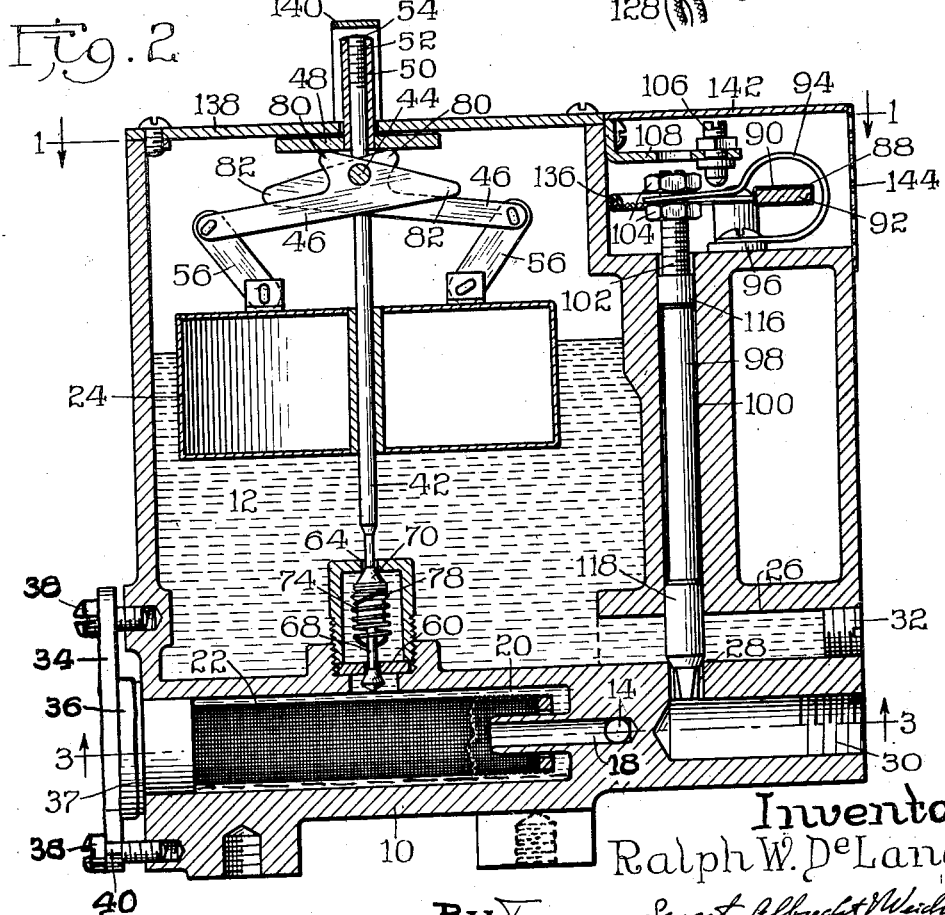
Inventor:
Ralph W. DeLancey
By Freeman, Sweet, Albrecht & Weidman
Attorneys

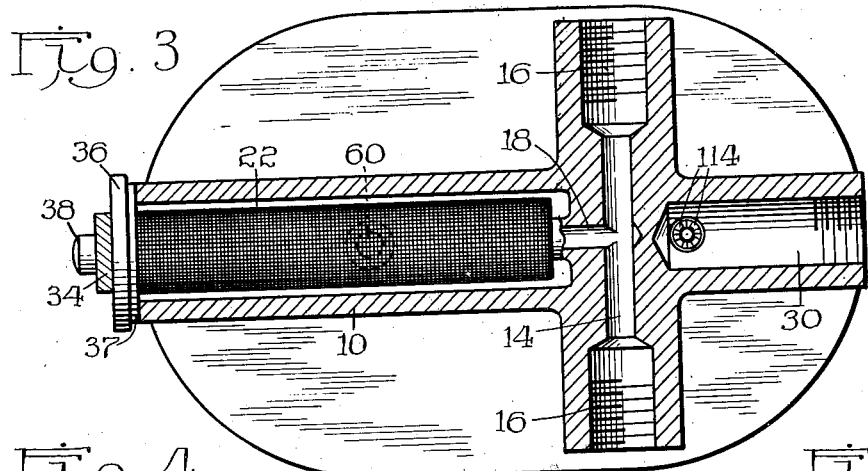
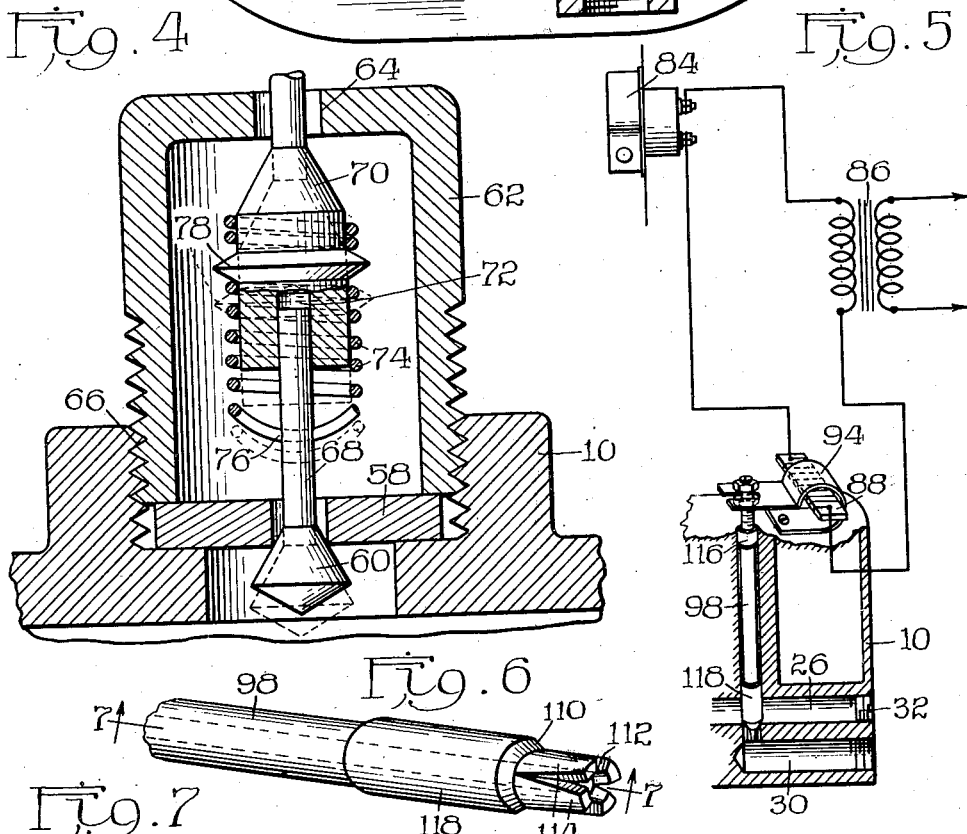
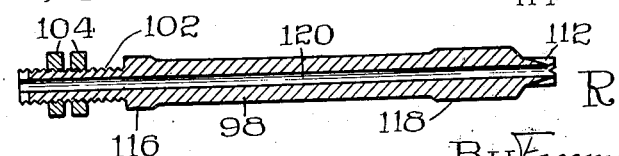

Patented Oct. 29, 1940

2,219,473

UNITED STATES PATENT OFFICE 2,219,473

FUEL FEED CONTROL

Ralph W. De Lancey, Meriden, Conn.

Application March 11, 1935, Serial No. 10,455
Renewed August 17, 1939

27 Claims. (Cl. 137—68)

The present invention relates to fuel feed control, and is more particularly directed toward the provision of controls in the fuel line for a liquid fuel burner, whereby the fuel from the main supply can be received in a suitable reservoir provided with valve mechanisms operated by a variably submerged liquid displacement element, such as a single float whereby the level of the liquid in the reservoir is maintained at a normal or service height, whereby upon leakage of liquid past the normal or service valve just referred to, the mechanism operates an emergency valve effective to securely shut off all inward flow of liquid.

The present invention also contemplates fuel feed controls of the above type wherein the valve mechanism is also completely and effectively closed whenever the liquid level is below a predetermined level lower than the normal level so that manual manipulation is necessary to open the valve mechanism preliminary to automatic operation of the valves by the float.

The present invention also contemplates the provision of valve mechanisms of the type referred to wherein the emergency valve when closed by excessive rise in fuel height in the reservoir may be automatically opened by merely draining fuel from the reservoir, so that automatic operation can be resumed as an incident to the use of the fuel without manual manipulation.

A further object of the invention is to provide the valve mechanism with such an arrangement of parts that when the emergency valve has closed off the flow of fuel in response to excessive rise in fuel height, a manual opening of the emergency valve to further flood the reservoir is practically impossible.

In the accompanying drawings:

Figure 1 is a plan view of a feed device according to the invention, as on line 1—1 of Figure 2;

Figure 2 is a section on line 2—2 of Figure 1;

Figure 3 is a section on line 3—3 of Figure 2;

Figure 4 is an enlarged detail section of the inlet valve proper;

Figure 5 is a diagram indicating the manner of installation;

Figure 6 is a perspective view of the working end of the flow control valve; and Figure 7 is a section on line 7—7 of Figure 6.

In the embodiment of the invention selected for illustration, the unit comprises a base 10 underlying the fuel storage reservoir 12. Fuel may enter the reservoir 12 through the cross bore 14, which communicates with duplicate inlet openings 16 facing in opposite directions for convenience in installation. From the cross bore 14 the fuel flows through the tubular opening 18 into the sump 20, being discharged in the first instance inside the tubular screen 22. From the sump 20 the fuel flows upward into the reservoir 12 to a height controlled by the valve mechanism operated by a variably submerged liquid displacement element, typically in the form of float 24. From the reservoir 12 the fuel passes to the burner proper through the upper discharge passage 26, then downwardly through the valve opening 28 and out at the lower discharge passage 30. The upper discharge passage 26 is first formed as a through bore and then plugged by the plug 32.

The screen 22 is removably fastened in place by a holding clip 34 pressing against the head 36 carrying the strainer element proper, which holding clip is fastened to the base 10 as by machine screws 38. The upper end of the holding clip encircles its screw, but the lower end is slotted at one side as at 40 to permit the clip to rotate about the upper retaining screw when the lower retaining screw is loosened. Washer 37 provides a seal.

The flow of fuel into the reservoir 12 is controlled by valve mechanism including the riser or valve stem 42, actuated by the float 24 and in turn actuating the valve mechanism proper.

Duplicate studs 44 extending in from opposite side walls of the reservoir afford pintles for duplicate rocker arms or levers 46. The lifting plate 48 overlies the rocker arms and is integrally united with the valve stem 42 as by means of the sleeve 50 on which the plate 48 is a press fit. The sleeve 50 has threaded engagement at 52 with the valve stem 42, and after the correct adjustment is made at the factory, a bit of solder is added at 54 to preserve the adjustment.

The position illustrated in Figure 2 is the emergency cut-off position which might result from a leakage in the lower control valve. Links 56 connect the outer ends of the rocker arms 46 with the float 24.

The valve mechanism proper is best illustrated in Figure 4. The base 10 is provided with a threaded counterbore 66 to receive an apertured lower valve seat member 58 and a threaded housing 62 adapted to clamp the member 58 in place and provide a chamber through which fuel must pass upwardly. The top of the housing 62 has an aperture accommodating the lower part of the stem 42 and providing a valve seat 64. The stem 42 carries an upwardly converging emergency valve member 70 cooperative with the seat 64, and the lower end of the valve member 70 is recessed at 72 to receive the stem 68 of a primary or service valve 60 having an upwardly converging conical surface adapted to form line contact with the valve seat member 58. I have illustrated a resilient lost motion connection between the valves in the form of a spring 74 having one end portion thrust transversely through the stem 68 as at 76, and its upper portion sprung over an annular enlargement 78 to complete the assembly. The position illustrated in Figure 4 is the normal or service closed position, with the spring 74 under enough tension to hold the valve 60 against the seat 58. The stem 42 and all the valve mechanism carried thereby is supported by the plate 48, which rests on the actuating arms. Because the whole mechanism dangles freely, the contact between the seats 58 and 64 and their respective valves assures perfect alignment of the parts.

With the parts in the position of Figure 4, if any tiny speck of dirt should prevent effective closure of the valve 60 so that leakage continues to force liquid in and raise the level in the reservoir 12, the further rise of the float 24 will continue the upward movement of the short horns 80 on the rocker arms 46 and will lift the valve mechanism to the position of Figure 2, where the upper valve also reaches its seat. It will be noted that the tension on spring 74 is the only force available acting to seat the lower valve. This is a very weak spring as compared with the dominating force which can be exerted by the float and hence the lower valve surfaces cannot be impaired by being merely held open by the piece of foreign matter. This will in general be washed away the next time the float descends to open both valves.

In the absence of such leakage the position of Figure 4 will be maintained until the withdrawal of fuel lets the float 24 sink and lower the stem 42 until the valve 60 is opened. Movement of the valve 60 to the dotted line position of Figure 4 will require movement of the stem 42 through a greater vertical displacement indicated clearly by the dotted line position for the enlargement 78 in Figure 4, which shows that the stem has descended a distance sufficient to let the stem 68 seat in the end of its guide opening 72, and an additional distance equal to the indicated opening displacement for the valve 60.

One of the more serious hazards in the use of such equipment results when the principal supply tank delivering fuel to the intake passage 14 is permitted to become empty. When this happens the reservoir 12 empties itself into the burner and then the burner and its pilot light are extinguished. With matters in this condition, if the user merely refills the main fuel tank without relighting the pilot light, it would be possible to empty the entire main fuel tank through the reservoir 12 and into the burner and flood the basement of the house with fuel, resulting in a serious fire hazard.

Each of the rocker arms 46 is provided with a long horn 82, and the lowering of the float 24 from the position of Figure 2 as the reservoir empties, will first open the emergency valve 70 and then the service valve 60. If the level in the reservoir goes on falling because there is no fuel flowing in, further lowering will bring the horns 82 up level with the horns 80, and beyond that position to bring the plate 48 back up to the position of Figure 2, and close both the service valve and the emergency valve. With the parts in this position, when the user refills the main tank, no fuel can flow into the reservoir 12 merely by reason of such refilling. The flow control unit is positioned near the burner and near the pilot light and it is necessary for the user, after refilling the main tank, to go down to the flow control unit and manipulate it to start the system operating again. Accordingly, after refilling the main fuel tank, the user goes down and by pressing downward with his fingers on the manually accessible sleeve 50, and owing to the leverages is able to readily lift the float 24 and open the valves 70 and 60 to let the reservoir 12 fill up. As the reservoir 12 fills, as soon as there is fuel enough to operate the pilot light, the operator can light the pilot light and the whole system resumes its automatic operation.

Should the float lose its buoyancy on account of leakage it would descend in the same way as though the fuel supply was becoming depleted and would ultimately sink, so that the mechanism between the float and valve stem would function to close one or both of the valves shutting off the flow of fuel into the chamber. With a leaky float manual manipulation would not be effective to restore the device to normal operation.

The automatic operation of such systems is usually under the control of a thermostat, indicated at 84 in Figure 5. I have diagrammatically indicated a transformer 86 for supplying low tension current to the thermostat 84.

When such a source of power is used to control the fuel flow to the burner by means of the usual solenoid, considerable difficulty is experienced because the abrupt opening of the valve floods the burner with fuel and this rapid rush of fuel not infrequently extinguishes the pilot light. This difficulty can be materially reduced by the use of an abnormally large pilot light or by the use of dash pots or equivalent damping means for the solenoid, or both, but such expedients are expensive and wasteful of fuel.

I have indicated a very tiny heater 88 connected in series with the thermostat 84 and transformer 86 to be warmed a little by the flow of electric current when the circuit is closed by the thermostat 84. The heater comprises a heating coil 90 and a mica support 92. Encircling the heater I employ a small bimetallic strip 94 anchored to the body of the device at 96 and extending around the heater and then laterally to terminate in a bifurcated end receiving the upper end of the valve stem 98. The valve stem 98 fits loosely in the bore 100 and has a threaded portion 102 passing through the bifurcated end of the bimetallic strip and provided with adjustment nuts 104. The maximum elevation of the valve stem 98 may also be independently adjusted by an adjustment screw 106 mounted in a bracket 108 and overlying the bimetallic strip.

The lower end of the valve stem 98 includes the conical seat portion 110. Below the seat 110 is a guiding extension comprising an initially cylindrical body with a slight downward taper, of materially smaller diameter than the valve passage 28. In this body I form four V-shaped grooves of increasing depth best indicated at 112 in Figure 6, between which grooves remain the segmental extensions 114 together constituting the extension guide.

The bore 100 is unsealed at its upper end and stands open to the atmosphere, except that the bearing portions 116 and 118 on the valve stem 98 restrict the annular clearance, and the upper bearing at 116 substantially eliminates any evaporation. Ordinarily, the annular space between the bearings around the valve stem 98 is filled with liquid up to the level of that in the reservoir 12.

The valve stem 98 also has a central axial bore 120 open at both ends and extending throughout its length. Accordingly, when the valve is in the closed position of Figure 2, the space in the outlet passage 30 is vented through the bore 120. This provides, not only drainage for the fuel passageways beyond the valve 28, but prevents the possibility of pocketing any air in the device at any time. Thus, in a system where the fuel level in the burner is at or above the level of the valve 28, there is never any air in the system, and where the burner is at a lower level perfect drainage occurs each time the valve is closed.

I have indicated physical connections for delivering electricity to the heater 88 comprising combined supporting clips and conductors 122 supported on spaced insulated binding posts 124 and 126. The clip 128 has an eyelet 130 to receive the cable 132. I prefer to provide an additional binding post 134 spaced from the eyelet 130 approximately the same distance as the binding post 124 and to run an inside connector 136 between the binding posts 126 and 134.

The reservoir proper is covered by a detachable cover 138 which includes a bail 140 forming a shield for the sleeve 50. The bimetallic strip and associated parts are preferably also enclosed in a housing having an imperforate top at 142 and a perforate or screen-like periphery at 144.

I prefer to proportion and design the parts so that when the thermostat 84 closes, the bimetallic strip will warm up and open the valve wide in from thirty to ninety seconds. Such slow opening of the valve is materially slower than can be obtained by any ordinary dash pot, and makes it possible to design the pilot light with the sole consideration of remaining lit, as the determining factor with respect to the size of the pilot light. Where the unit is to be installed in an extremely cold or draughty position, it can readily be sheltered by covering up part of the screen 144 and, conversely, where it is to operate in a position where there is little or no circulation of air available, the screen can be partly cut away or entirely removed. However, I have found that in the form disclosed in the drawings, the unit will operate in an entirely satisfactory way in anything short of extremely abnormal conditions of ventilation and temperature.

Without further elaboration, the foregoing will so fully explain my invention, that others may, by applying knowledge current at the time of such application, readily adapt the same for use under various conditions of service.

The thermostatically controlled outlet valve forms the subject matter of my co-pending divisional application Serial No. 210,884, filed May 31, 1938.

I claim:

1. In a fuel feed control apparatus: a reservoir; a variably submerged liquid displacement element in said reservoir; duplicate valve-actuating levers connected to said element to be actuated thereby; a plate riding on said levers; a stem depending from said plate; an emergency valve positively actuated by said stem; a service valve resiliently connected to said stem; said plate, stem, and valves resting by gravity on said levers and dangling freely; and stationary valve seats positioned to engage said valves upon upward movement thereof; said valves and seats having engagement on surfaces oblique to the valve axis whereby the seating engagement aligns the valve; said levers having projections adapted to lift said plate and close said valves upon undue rise of the liquid level; and other projections adapted to close said valves upon excessive fall of liquid level; and a manually accessible projection carried by said plate for manually opening said valves; said projections operating at low liquid level having a small effective force permitting manual opening of said valves; said projections operating at a high liquid level having a higher effective force substantially preventing manual manipulation.

2. In a fuel feed control apparatus: a reservoir; a variably submerged liquid displacement element in said reservoir; a valve actuator connected to said element to be actuated thereby; a plate riding on said actuator; a stem depending from said plate; an emergency valve positively actuated by said stem; a service valve resiliently connected to said stem; said plate stem and valves resting by gravity on said levers and dangling freely; and stationary valve seats positioned to engage said valves upon upward movement thereof; said valves and seats having engagement on surfaces oblique to the valve axis whereby the seating engagement aligns the valves.

3. In a fuel feed control: a valve seat having a vertical bore, a substantially flat downwardly facing surface, and a sharp edge defining the intersection of said bore and surface; a conical valve member with its apex uppermost, and flexible tension means for drawing said valve member up from below to seat against said edge; a second valve seat and valve above said first mentioned valve seat and valve, means between said valve seats defining a chamber surrounding said first mentioned valve, whereby said valves operate in series to control the same liquid flow; a tension connection between said first valve and said second valve, the length of said connection being such that said second valve closes first; said connection being extensible to permit said first valve to close after said second valve is seated; and means for causing the flow of fuel to be controlled to pass through said valves in an upward direction.

4. In a fuel feed control: a valve seat having a bore, and a substantially flat downwardly facing surface; a valve member in the form of a cone with its apex uppermost, and means for drawing said valve member up from below to seat against said seat; a second valve seat and valve below said first mentioned valve seat and valve, means between said valve seats defining a chamber surrounding said first mentioned valve, whereby said valves operate in series to control the same liquid flow; a tension connection between said first valve and said second valve; and means for causing the flow of fuel to be controlled to pass through said valves in an upward direction.

5. In a fuel feed control: a valve seat having a bore, and a downwardly facing seat surface; a valve member in the form of a cone with its apex uppermost, and means for drawing said valve member up from below to seat against said seat; a second similar valve seat and valve below said first mentioned valve seat and valve; means between said valve seats defining a chamber surrounding said first mentioned valve, whereby said valves operate in series to control the same liquid flow; a tension connection between said first valve and said second valve; and means for causing the flow of fuel to be controlled to pass through said valves in an upward direction.

6. In a fuel feed control apparatus: a reservoir; a variably submerged liquid displacement element in said reservoir; a movable valve element adapted to close by movement in one direction only; a mechanical transmission between said liquid displacement element and valve element for closing said valve upon movement of said liquid displacement element either above or below a predetermined level; said transmission including a fixed pivot; a lever on said pivot connected to said liquid displacement element to move continuously during the rise and fall of said liquid displacement element; and abutment means carried by said valve element; said lever and abutment means being shaped to have cam engagement, whereby said valve moves to closed position upon rotation of said lever in either direction from a predetermined "open" position.

7. In a fuel feed control apparatus: a reservoir; a variably submerged liquid displacement element in said reservoir; a valve-actuating lever connected to said element to be actuated thereby; a transmission member riding on said lever; a stem depending from said member; an emergency valve positively actuated by said stem; a service valve resiliently connected to said stem; and stationary valve seats positioned to engage said valves upon upward movement thereof; said valves and seats having engagement on surfaces oblique to the valve axis, whereby the seating engagement aligns the valves; said lever having a first contact surface positioned and arranged to engage and actuate said transmission member, to close said valves upon undue rise of the liquid level; said lever having a second contact surface positioned and arranged to engage and actuate said transmission member to close said valves upon undue fall of the liquid level; and manual adjustment means between said transmission member and said valves.

8. In a fuel feed control apparatus: a reservoir; a variably submerged liquid displacement element in said reservoir; a valve-actuating lever connected to said element to be actuated thereby; a transmission member riding on said lever; a stem depending from said member; a valve actuated by said stem; a stationary valve seat positioned to engage said valve upon upward movement thereof; said valve and seat having engagement on surfaces oblique to the valve axis, whereby the seating engagement aligns the valve; said lever having a first contact surface positioned and arranged to engage and actuate said transmission member, to close said valve upon undue rise of the liquid level; said lever having a second contact surface positioned and arranged to engage and actuate said transmission member to close said valve upon undue fall of the liquid level; and manual adjustment means between said transmission member and said valve.

9. In a liquid fuel feeding apparatus, a reservoir having an inlet and an outlet, a valve for opening and closing the outlet so that liquid may be retained in or drained from the reservoir, service valve means and emergency valve means for controlling flow of liquid into said reservoir, manual means for opening said valves to admit liquid to the reservoir, a variably submerged liquid displacement element in the reservoir and mechanism actuated thereby for closing both valve means when the liquid level is below a predetermined minimum whereby they may remain closed until manually opened, and for maintaining both valve means open when the liquid level is below a second predetermined height above the first stated minimum, the element acting on the service valve means only to effect closure of the inlet when the liquid level reaches said second predetermined height and being movable should excess liquid enter the reservoir to thereafter actuate the emergency valve means to closed position, the emergency valve means being held closed solely by buoyancy of the element and being opened by lowering of the element upon withdrawal of liquid through the outlet.

10. A device adapted to be interposed in the supply line of a gravity fed liquid consuming apparatus, having an intermediate reservoir open to the atmosphere, a discharge outlet, and liquid level responsive mechanism including a variably submerged liquid displacement element operably connected to an inlet valve acting to normally keep the level of liquid in said reservoir at a predetermined level, and a second inlet valve operated by the same element upon rise in liquid above said predetermined level to more securely close off the flow of liquid into the reservoir and operated upon a lowering of liquid level to an open position whereby upon a further lowering of the liquid level the first mentioned inlet valve is opened.

11. A device such as claimed in claim 10, wherein the second-mentioned inlet valve is nearer the reservoir than the first-mentioned inlet valve and actuated by the liquid displacement element through a greater range of movement than the first-mentioned inlet valve, and wherein a spring seats the first-mentioned inlet valve.

12. A device such as claimed in claim 10, wherein the liquid level responsive mechanism also includes connections effective when the liquid displacement element is below a predetermined height to seat both valves.

13. A device for controlling the flow of fluids comprising a reservoir having an inlet passage including a lower valve seat and an upper valve seat and a chamber forming wall whereby liquid entering the reservoir must pass by both valve seats, an upper valve stem extending through the passage above the upper valve seat and having a valve member cooperative with said upper valve seat, a lower valve stem slidable with respect to the first, a spring yieldably securing it to the upper valve stem, the lower stem extending down through the passage to be below the lower valve seat and carrying a valve member cooperative with the lower valve seat and normally held closer to the upper valve member than the spacing of the valve seats whereby upon lifting the upper valve stem the lower valve member is seated prior to the seating of the upper valve member.

14. A device such as claimed in claim 13, having a variably submerged liquid displacement element in the reservoir operatively connected to the upper valve stem to move the stem back and forth in accordance with the liquid level and thereby lift the stem so that lower valve member may be seated to control the normal level of liquid in the reservoir, to lift the stem to a higher elevation on excess rise of liquid level in the reservoir to stretch the spring and seat the upper valve member without unseating the lower valve member, and to thereafter in response to lowering of liquid level lower the stem to first unseat the upper valve member and then the lower valve member.

15. A device such as claimed in claim 13, having a variably submerged liquid displacement element in the reservoir operatively connected to the upper valve stem to lift the stem when the element is below a predetermined height and seat both valve members.

16. A device such as claimed in claim 13, having a variably submerged liquid displacement element in the reservoir operatively connected to the upper valve stem to lift the stem when the element is below a predetermined height and seat both valve members, and a manually operable device for lifting the stem to unseat the valve members to permit flow into the reservoir.

17. In a device for controlling the flow of liquids, a reservoir having an inlet passage with two fixed valve seats in series, two valve members interconnected to have a normal spacing different from that of the valve seats but relatively movable so that they can have the same spacing as the valve seats whereby they may be seated on the valve seats in sequence and be unseated in reverse sequence, a variably submerged liquid displacement element in the reservoir, and means operatively connecting the element to the valve members to hold both members seated when the element is at a predetermined high elevation, to unseat one and then the other as the element lowers and then on further lowering to reseat the second and then the first.

18. In a fuel feed control, a storage reservoir, an inlet passage in the bottom having two downwardly facing fixed valve seats past both of which liquid must flow upwardly to enter the reservoir, a variably submerged liquid displacement element in the reservoir responsive to liquid level therein, two upwardly facing conical valve members each disposed below and cooperative with a valve seat to open and close the passage, a connection from the element to the upper valve member, and a yieldable connection between the lower and upper valve members which permits the element to lift the upper valve member when the lower valve member is seated.

19. In a device for controlling the flow of liquids, a reservoir having in the bottom thereof an inlet passage with an upper, fixed, downwardly facing, annular valve seat element, a variably submerged liquid displacement element in the reservoir, and a valve stem operated by said liquid displacement element extending down through the upper valve seat element and carrying an upwardly facing valve element movable by the liquid displacement element relative to the upper valve seat element for cooperation therewith to open and close the passage, the passage having a second lower, downwardly facing, annular valve seat element in series with the upper valve seat element, the valve stem extending down through the lower valve seat element and carrying a lower, upwardly facing, valve element movable by the liquid displacement element relative to the lower valve seat element for cooperation therewith to open and close the passage, one of the lower set of cooperating valve elements being yieldable relative to the other similar element when the lower pair of elements is brought into engagement by a rising liquid displacement element so that on further rise of the liquid displacement element the upper set of cooperating valve elements may be brought into engagement.

20. In a fuel feed control, a storage reservoir, an inlet passage in the bottom having two fixed valve seats facing in one direction and past both of which liquid must flow upwardly to enter the reservoir, a variably submerged liquid displacement element in the reservoir responsive to liquid level therein, two valve members facing in the other direction, each cooperative with a valve seat to open and close the passage, a direct connection from the element to the adjacent valve member whereby forces of substantial amount may be applied to seat the same, a lost motion connection between the element and the other valve member which permits overtravel of the element after the said other member is seated, and spring means effective to produce only a limited seating force to seat the said other valve member when the element is in a predetermined position ineffective for seating the first valve member.

21. In a device for controlling the flow of liquids, a reservoir having an inlet passage with two fixed valve seats in series, two valve members interconnected to have a normal spacing different from that of the valve seats but relatively movable so that they can have the same spacing as the valve seats whereby they may be seated on the valve seats in one sequence in response to a movement of the first valve member in one direction and unseated in reverse sequence in response to a reverse movement of the first valve member, a variably submerged liquid displacement element in the reservoir, element controlled means acting directly on the first valve member to move it into and out of engagement with the corresponding valve seat whereby the other valve member may be seated before the first-mentioned valve member is seated and unseated after the first-mentioned valve member has been unseated.

22. In a fuel feed control, a chamber, an inlet passage having downwardly facing, upper and lower valve seats in series and through which fuel flows upwardly to enter the chamber, valve members corresponding with and disposed below the valve seats, the valve members normally having a closer spacing than the seats and being interconnected to permit overtravel of the upper valve member relative to the lower valve member so that they may seat in one sequence and unseat in the reverse sequence, a variably submerged liquid displacement element in the chamber for actuating the upper valve member, and a seating spring for the lower valve member for seating said member while the upper valve member is adjacent to, but out of contact with, its seat.

23. A device for controlling the flow of liquids comprising a chamber to receive the liquid, an inlet passage through which liquid flows into the chamber, a valve seat in said passage, a cooperative valve member for opening and closing the passage, said valve member being reciprocable and biased to open position, a variably submerged liquid displacement element in the chamber, and valve member operating means actuated by the liquid displacement element to seat the valve member when the liquid displacement element is at a predetermined upper position and also to seat the valve member when the liquid displacement element is at a predetermined lower position, a second valve seat in said passage beyond the first, and a second valve member controlled by said liquid displacement element and cooperative with the second seat for closing the passage before the liquid displacement element reaches either extreme position.

24. A device for controlling the flow of liquids comprising a reservoir to receive the liquid, the bottom of the reservoir having an upwardly opening inlet passage through which liquid flows into the reservoir, a valve seat in said passage, a cooperative, vertically reciprocable valve member biased toward a position to open the passage, a variably submerged liquid displacement element in the reservoir responsive to liquid lever therein, means to operably connect the liquid displacement element to the valve member to positively move it to closed position at a predetermined upper position of the liquid displacement element, the reservoir having a discharge outlet adapted to drain the liquid to a predetermined low level, and means operated by said liquid displacement element and effective when the liquid displacement element is moved downwardly to substantially said low level for positively moving the valve member to closed position.

25. A device such as claimed in claim 24, wherein the valve member has a loading weight which holds the valve member in open position.

26. A device such as claimed in claim 24, wherein the variably submerged liquid displacement element is in the form of a normally buoyant hollow float sinkable on loss of buoyancy irrespective of liquid level to a position to move the valve member to closed position.

27. A device adapted to be interposed in the supply line of a gravity fed liquid consuming apparatus, having an intermediate reservoir open to the atmosphere, an upwardly opening inlet in the bottom of the reservoir, a discharge outlet adapted to drain the liquid to a predetermined minimum low level, liquid level responsive mechanism including a variably submerged liquid displacement element, a vertically-movable, inlet valve member in said opening and operated by said liquid displacement element to normally keep the level of liquid in said reservoir at a predetermined higher level and to close the inlet passage when liquid is drained to said minimum low level, and a weight acting on the valve member to keep the inlet passage open while the lquid level lowers toward the minimum low level, the liquid displacement element acting to lift the weight and move the valve member toward closed position as said minimum low level is approached.

RALPH W. DE LANCEY.